United States Patent [19]

Burdon et al.

[11] Patent Number: 5,046,601

[45] Date of Patent: Sep. 10, 1991

[54] SCRAPER CHAIN CONVEYOR ASSEMBLIES

[75] Inventors: Christopher Burdon; Michael J. Millington; Kevin S. Ward, all of Kidderminster, England

[73] Assignee: Parsons Chain Company Limited, Worcestershire, England

[21] Appl. No.: 596,548

[22] Filed: Oct. 12, 1990

[30] Foreign Application Priority Data

Oct. 19, 1989 [GB] United Kingdom ............ 8923566

[51] Int. Cl.⁵ .................................... B65G 19/24
[52] U.S. Cl. ................................ 198/731; 198/728
[58] Field of Search ..................... 198/728, 730, 731

[56] References Cited

U.S. PATENT DOCUMENTS 3,902,591  9/1975  Temme ................. 198/731

FOREIGN PATENT DOCUMENTS 2613986 10/1977 Fed. Rep. of Germany ....... 198/731
0982398  2/1965 United Kingdom ............... 198/728
1423351  2/1976 United Kingdom ............... 198/731

Primary Examiner—Robert P. Olszewski
Assistant Examiner—James R. Bidwell
Attorney, Agent, or Firm—Shlesinger, Arkwright & Garvey

[57] ABSTRACT

A shackle connector 8 for a scraper chain conveyor assembly in which the shackle connectors 8 are interlinked with chains 2,4, bolted to scraper bars 6 and formed with an enlarged portion or pad 20 serving slidably to guide the assembly relative to the inner profile of an associated trough or pan. The shackle connectors 8 are selectively heat treated such that the surface or surface and sub-surface hardness value of the enlarged portions or pads 20 is in the range of approximately 280–380 (preferably 340–380) Brinel Hardness and the remainder of the shackle connector, or at least crown portions 10, 12, have a surface or a surface and sub-surface hardness value in the range of approximately 380–550 (preferably 440–500) Brinel hardness and such that the mechanical properties of the shackle connector are enhanced while any propensity towards the propagation of frictionally induced surface cracks is resisted.

7 Claims, 1 Drawing Sheet

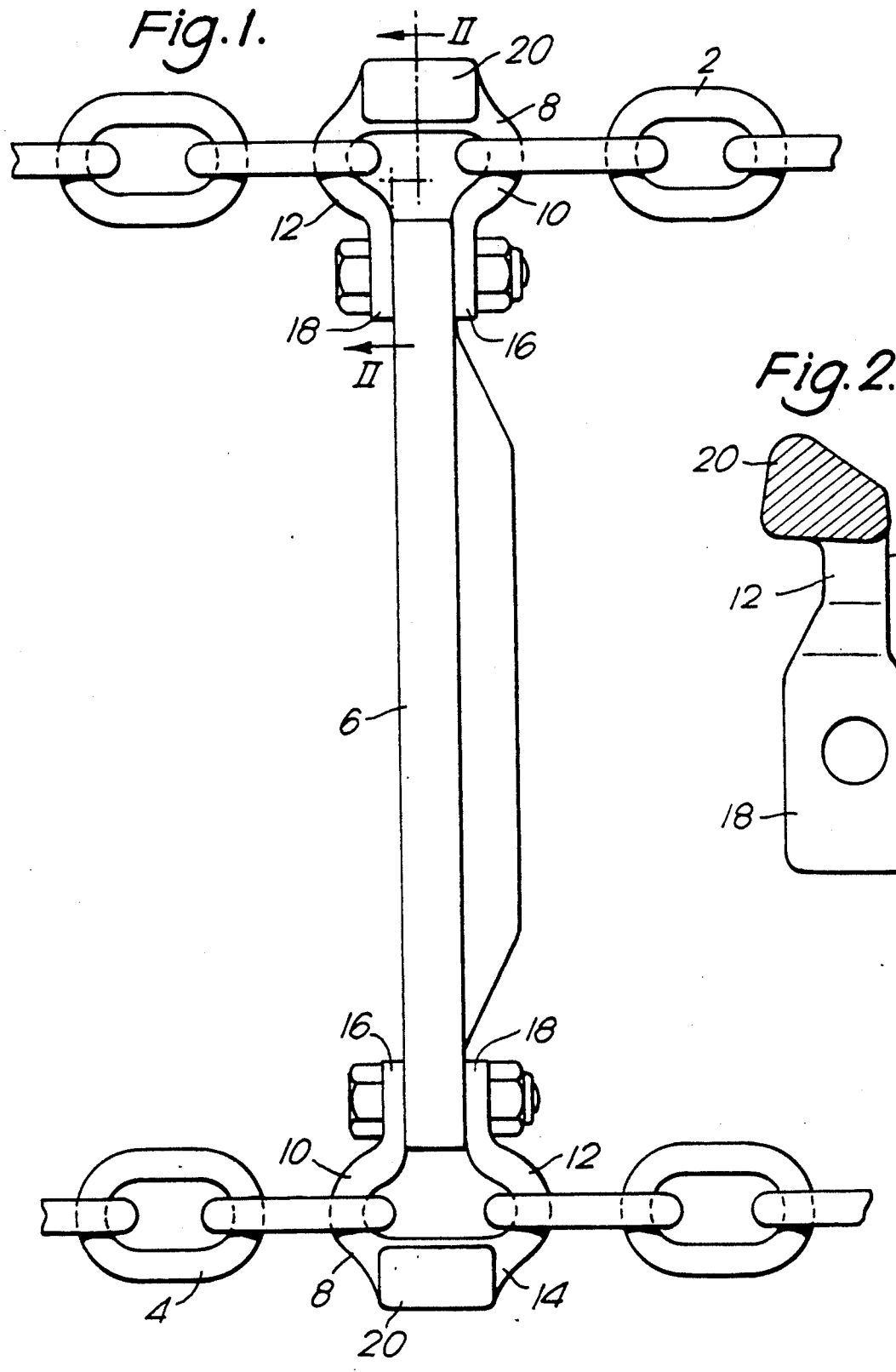

SCRAPER CHAIN CONVEYOR ASSEMBLIES

DESCRIPTION

This invention relates to scraper chain conveyor assemblies running in troughs or pans, and, more particularly, to conveyors including a pair of spaced endless chains having scraper bars connected thereto at intervals along the chains by means of shackle connectors interlinked with the chains and bolted or otherwise attached to the scraper bars. In order to facilitate running of the chains and to improve conveyor characteristics, outer portions of the shackle connectors are formed with enlarged portions or pads arranged to bear on the wall surfaces of the troughs or pans.

It will be appreciated that the failure free performance of scraper chain conveyor assemblies depends on the individual mechanical properties of the chain, scraper bars and shackle connectors. Since the shackle connectors would otherwise achieve lesser mechanical properties than the mechanical properties of the associated chain, the mechanical properties of such shackle connectors in the past have been increased by increasing the hardness levels of the shackle connectors. However the use of higher hardness levels in the shackle connectors gives rise to a situation in which the pad portions of the shackle connectors when subjected to extended rubbing friction by bearing on wall surfaces of the troughs or pans suffer induced localised heating in the pad surface which can initiate localised surface cracking. With extended use such cracks propagate leading to service failures. Thus there are limitations (other than the degree to which the material may be hardened) to the hardness levels and thus the mechanical properties of shackle type connectors if such service failures are to be avoided.

According to the present invention there is provided a shackle connector for a scraper chain conveyor assembly, the shackle connector including a pair of semi-toroidal crown portions having one pair of opposed extremities connected together by a leg portion provided with an enlarged portion or pad and the other pair of opposed extremities connected to respective laterally extending limbs adapted to be secured to a scraper bar of the scraper chain conveyor assembly in which the surface or surface and sub-surface hardness value of the enlarged portion or pad of the shackle connector is substantially less than the surface hardness value of the remainder of the shackle connector.

Desirably, the shackle connector is of forged fabrication and is initially heat treated to achieve a substantially uniform hardness value and is then subjected to a selective heat treatment process to reduce the surface or surface and sub-surface hardness value of the enlarged portion or pad to a lower hardness value. Alternatively, the shackle connector is of forged fabrication and is initially heat treated to achieve a substantially uniform hardness value and is then subjected to a selective heat treatment process to increase the surface or surface and sub-surface hardness value of the crown portions to a higher hardness value.

Suitably, the surface and sub-surface hardness value of the enlarged portion or pad is reduced by the selective heat treatment process to a value appropriate to inhibition of the formation and propagation of cracks during service whilst the crown portions of the shackle connector body remain at the initially heat treated higher hardness value to enhance mechanical properties and wear resistance.

Alternatively, the shackle connector is initially heat treated to achieve a substantially uniform hardness value appropriate to inhibition of the formation and propagation of cracks during service and is then subjected to a selective heat treatment process to increase the surface or surface and sub-surface hardness value of the crown portions to a hardness value giving enhanced mechanical properties and wear resistance.

Preferably, following selective heat treatment the enlarged portion or pad has a surface or surface and sub-surface hardness value in the range of approximately 280 to 380 Brinel Hardness and the remainder of the shackle connector or at least the crown portions thereof has a surface or surface and sub-surface hardness value in the range of approximately 380 to 550 Brinel Hardness.

Advantageously, following selective heat treatment the enlarged portion or pad has a surface or surface and sub-surface hardness value of 340–380 Brinel Hardness and the remainder of the shackle connector or at least the crown portions thereof has a surface or surface and sub-surface hardness value of 440–500 Brinel Hardness.

The invention will now be described, by way of example, with reference to the accompanying, partly diagrammatic, drawings, in which:

FIG. 1 is a plan view of a portion of a scraper chain conveyor assembly running in a trough or pan, and FIG. 2 is a cross-section taken on the staggered line II—II of FIG. 1.

Referring to the drawings, there is shown a pair of spaced endless chains 2, 4 having scraper bars 6 connected thereto at intervals along the chain by means of shackle connectors 8. The shackle connectors 8 are interlinked with the chains 2, 4 and bolted to the scraper bars 6.

Each shackle connector includes a pair of semi-toroidal crown portions 10, 12 having one pair of opposed extremities connected together by a leg portion 14 and the other pair of opposed extremities connected to respective laterally extending limbs 16, 18 arranged to embrace opposed faces of the scraper bar 6. As shown in cross-section to an enlarged scale in FIG. 2, the leg portion 14 is formed with an enlarged portion or pad 20 arranged to extend toward inner profile or sides and the base of the trough or pan.

The shackle connectors are formed by forging and machining, at the conclusion of which the shackle connector is heat treated to achieve a substantially uniform Brinel hardness value in the range of approximately 440 to 500 and, preferably, 470.

A further heat treatment is then instituted to produce a gradated reduction in the surface or surface and sub-surface hardness of the enlarged portion or pad 20 and associated portions of the leg 14, so that the enlarged portion or pad has a Brinel surface or surface and sub-surface hardness value in the range of approximately 340–380 and, preferably, approximately 363. Such a localised heat treatment may be achieved by attaching electrodes, of copper, for example, to the leg 14 adjacent each end of the enlarged portion or pad 20 and passing an electric, heating current through the enlarged portion or pad to raise the localised temperature to an appropriate value to produce the required hardness. Alternatively, the localised heating may be achieved by immersing the leg 14 and enlarged portion 20 into a heating medium or by subjecting the leg 14 and enlarged portion 20 to electric induction heating by means of an induction coil positioned around the leg 14 and/or the enlarged portion 20.

By utilising a lower surface or surface and sub-surface hardness for the enlarged portion or pad 20 whilst retaining a higher hardness for the remainder of the shackle connector 8, mechanical properties of the shackle connector are enhanced whilst any propensity towards the propagation of frictionally induced surface cracks is resisted.

Whilst the invention has been described in conjunction with one form of shackle connector, it will be appreciated that the invention is also applicable to other forms of connectors for scraper chain conveyors in which the connector includes a wear pad portion contacting the surface of the associated troughs or pans, and in which the connector may be attached to the scraper bar in manners other than being directly bolted thereto.

We claim:

1. A shackle connector for a scraper chain conveyor assembly, the shackle connector including a pair of semi-toroidal crown portions having one pair of opposed extremities connected together by a leg portion provided with an enlarged portion or pad and the other pair of opposed extremities connected to respective laterally extending limbs adapted to be secured to a scraper bar of the scraper chain conveyor assembly, wherein the surface or surface and sub-surface hardness value of the enlarged portion or pad of the shackle connector is substantially less than the surface hardness value of the remainder of the shackle connector.

2. A shackle connector as claimed in claim 1, wherein the shackle connector is of forged fabrication and is initially heat treated to achieve a substantially uniform hardness value and is then subjected to a selective heat treatment process to reduce the surface or surface and sub-surface hardness value of the enlarged portion or pad to a lower hardness value.

3. A shackle connector as claimed in claim 1, wherein the shackle connector is of forged fabrication and is initially heat treated to achieve a substantially uniform hardness value and is then subjected to a selective heat treatment process to increase the surface or surface and sub-surface hardness value of the crown portions to a higher hardness value.

4. A shackle connector as claimed in claim 1, wherein the surface and sub-surface hardness value of the enlarged portion or pad is reduced by the selective heat treatment process to a value appropriate to inhibition of the formation and propagation of cracks during service whilst the crown portions of the shackle connector body remain at the initially heat treated higher hardness value to enhance mechanical properties and wear resistance.

5. A shackle connector as claimed in claim 1, wherein the shackle connector is initially heat treated to achieve a substantially uniform hardness value appropriate to inhibition of the formation and propagation of cracks during service and is then subjected to a selective heat treatment process to increase the surface or surface and sub-surface hardness value of the crown portions to a hardness value giving enhanced mechanical properties and wear resistance.

6. A shackle connector as claimed in claim 5, wherein following selective heat treatment the enlarged portion or pad has a surface or surface and sub-surface hardness value in the range of approximately 280 to 380 Brinel Hardness and the remainder of the shackle connector or at least the crown portions thereof has a surface or surface and sub-surface hardness value in the range of approximately 380 to 550 Brinel Hardness.

7. A shackle connector as claimed in claim 5, wherein following selective heat treatment the enlarged portion or pad has a surface or surface and sub-surface hardness value of 340-380 Brinel Hardness and the remainder of the shackle connector or at least the crown portions thereof has a surface or surface and sub-surface hardness value of 440-500 Brinel Hardness.

* * * * *